United States Patent

De Lang

[19]

[11] Patent Number: 6,020,912
[45] Date of Patent: Feb. 1, 2000

[54] VIDEO-ON-DEMAND SYSTEM

[75] Inventor: Desirée De Lang, Eindhoven, Netherlands

[73] Assignee: U.S. Philips Corporation, New York, N.Y.

[21] Appl. No.: 08/677,232

[22] Filed: Jul. 9, 1996

[30] Foreign Application Priority Data

Jul. 11, 1995 [EP] European Pat. Off. ............. 95201893

[51] Int. Cl.[7] .................................................. H04N 7/10
[52] U.S. Cl. ............................................. 348/7; 709/219
[58] Field of Search .................... 348/3, 6, 7, 10, 348/12, 13; 455/2, 5.1, 6.1, 6.2; 345/327, 328; 709/219; H04N 7/00, 7/10, 7/14

[56] References Cited

U.S. PATENT DOCUMENTS

| 5,027,400 | 6/1991 | Baji et al. ................................. 380/20 |
| 5,341,474 | 8/1994 | Gelman et al. ........................ 395/200 |
| 5,371,532 | 12/1994 | Gelman et al. ............................. 348/7 |
| 5,528,282 | 6/1996 | Voeten et al. ............................... 348/7 |
| 5,532,735 | 7/1996 | Blahut et al. ............................. 348/13 |
| 5,684,918 | 11/1997 | Abecassis ................................. 386/83 |
| 5,815,146 | 9/1998 | Youden et al. .......................... 345/327 |

FOREIGN PATENT DOCUMENTS

0676898A1  10/1995  European Pat. Off. .

OTHER PUBLICATIONS

International Conference on Communications pp. 842–846, vol. 2, 1991 (IEEE, New York, NY, USA), Gelman A.D. et al, "A store–and–forward architecture for video–on–demand service", see p. 843, col 1, p. 845, col 2, p. 846, col 1.

*Primary Examiner*—Victor R. Kostak
*Attorney, Agent, or Firm*—Laurie E. Gatham

[57] ABSTRACT

A video-on-demand system comprises a server station and a user station. The server is adapted to transmit a selected television signal with operating data defining a selected one of various available sets of playback modi (normal, fast forward, slow forward, rewind, pause, etc.) in response to operating signals from the user station indicating the selected set of playback modi. Operating data which define the various available operating signals (the user interface) are fixed in the server and are transmitted by the server to the user station. Downloading of different sets of the user interface at different prices is possible. For example, a television program with commercials may be offered at a higher price if it includes the facility of fast forward during commercials.

13 Claims, 3 Drawing Sheets

VIDEO-ON-DEMAND SYSTEM

The invention relates to a video-on-demand system, comprising a video server for transmitting a selected television signal and provided with means for playing back the television signal in one of a plurality of playback modi defined by operating signals, and a user station for receiving and displaying the television signal, and provided with an operating circuit for generating and transmitting said operating signals to the server. The invention also relates to the server and the user station which forms part of such a system. The system is also applicable to, for example, teleshopping systems.

A video-on-demand server may essentially be considered as a remote video recorder on which a selected television program is played back. Just like a home video recorder, the server has different playback modi. These are features such as fast and slow display, still pictures, wind and rewind, and the like. The various playback modi, which are also referred to as trick modi, are activated by the user. To this end, the user station has operating keys or means for displaying the operating menu on the display screen.

It is possible to offer different versions of a television program at different prices, for example, a motion film interrupted by commercials at a low price and the same motion film without commercials at a higher price. However, not all commercials are equally troublesome to every user. Commercials focusing on special target groups may be extremely sensible, particularly to the user paying a higher price.

It is an object of the invention to provide a video-on-demand system with which attractive possibilities of use are offered to the user.

According to the invention, the video server is therefore adapted to transmit operating data to the user station for defining the available playback modi. The operating circuit in the user station is adapted to receive and store the operating data and to generate the corresponding operating signals.

It is achieved by the invention that the user station can offer the server-operable operating functions to the user, for example as an operating menu. For example, a television program interrupted by commercials may be transmitted with operating data rendering only the playback functions "play" and "pause" possible. Alternatively, a television program may be transmitted with operating data rendering fast display possible. The latter television program may also comprise commercials, but these can now be skipped by the user or displayed fast. A higher price may of course be charged for such a television program. Means for charging the program with a given price are constituted, for example, by a device for reading and writing a chip card, or a device for entering a PIN code.

In a further embodiment, the server comprises a plurality of different sets of operating data which are selectable by the user station. The user himself can now decide whether he wants to watch a television program with or without trick modi. The amount to be charged may be different for each set of operating data, for example, an inexpensive version with "play" and "pause" functions only and a more expensive version providing the possibility of fast winding, fast display, etc. A particularly great advantage is that only one version of the relevant television program needs to be stored in the server.

In another embodiment, the server is adapted to modify the operating data during the transmission of the television program. This provides the possibility of modifying the available trick modi dynamically so that a program offered at a low price may be displayed, for example, at a fast rate, but not during the commercials.

The display screen of the user station preferably indicates which operating signals are available. As compared with operating keys, this has the advantage that it is avoided that the user thinks some keys are out of order.

These and other aspects of the invention will be apparent from and elucidated with reference to the embodiments described hereinafter.

Figure 1:
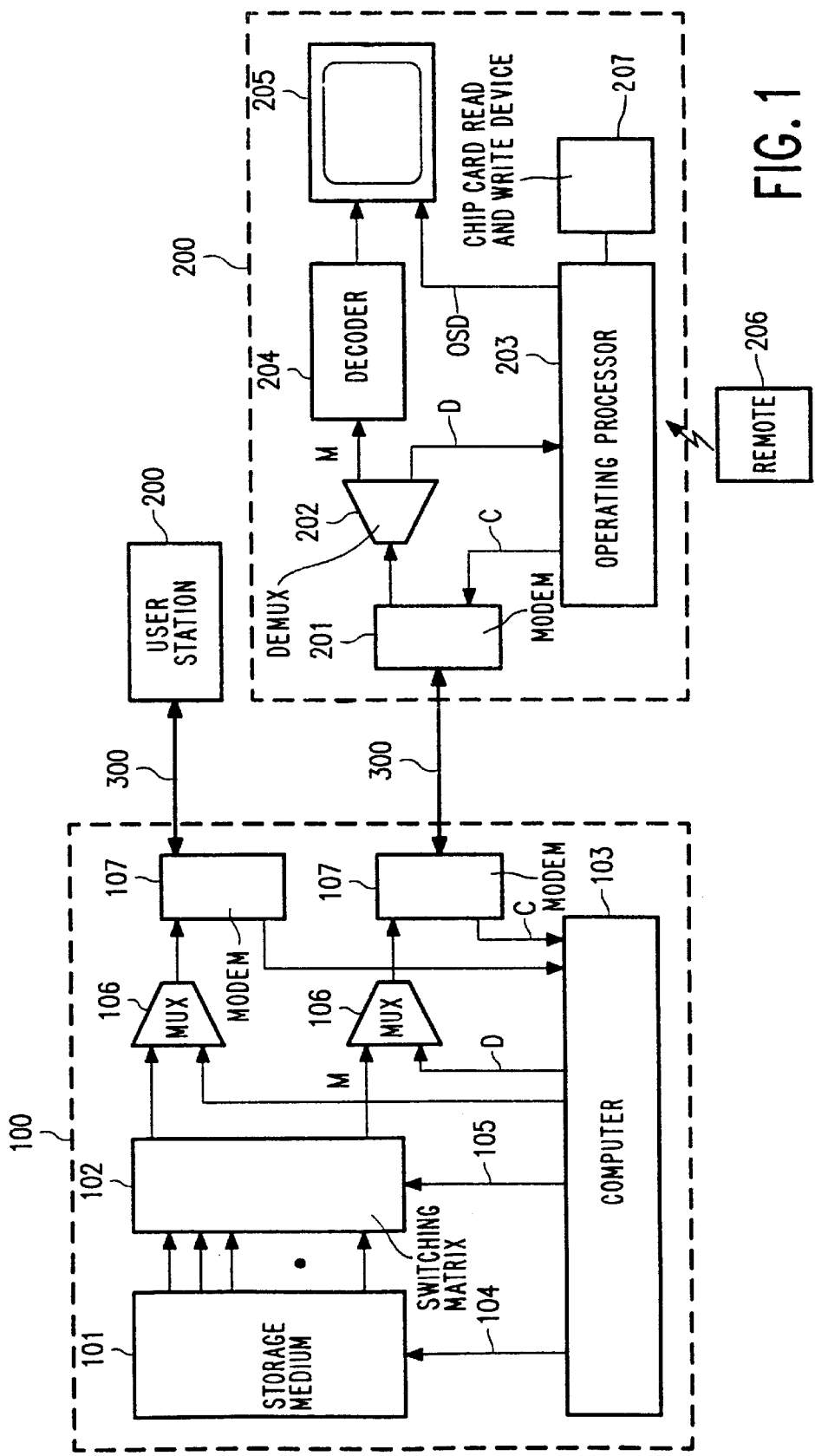
FIG. 1 is a block diagram of a video-on-demand system according to the invention.

FIG. 1 is a block diagram of a video-on-demand system according to the invention. The system comprises a video server 100 to which user stations 200 are connected via bidirectional transmission channels 300. These may be ordinary telephone connections, satellite connections, a coax cable network or a combination thereof.

The video server 100 comprises a storage medium 101, for example, an array of hard discs on which a large number of selectable television programs in digital and compressed form is stored. The storage medium may simultaneously play back a plurality of stored programs and transmit them to the user stations via a switching matrix 102. Storage medium 101 and switching matrix 102 are controlled by a computer 103, hereinafter also referred to as supervisor. More specifically, the supervisor determines via a connection 104 which of the stored television programs is played back and in which playback mode this is effected (normal, still picture, fast display, slow display, fast winding and rewinding, etc.). The way in which the different playback modi are realized is not essential for the invention. Via a connection 105, the supervisor determines which program will be transmitted to which user station.

The television programs are preferably transmitted in the form of a digital MPEG bit stream M. The supervisor also generates data signals D for the relevant user station. These data signals are accommodated by means of an MPEG multiplexer 106 in the bit stream to the user station. The compression and digital transmission of video, audio and data is nowadays generally known by the name of MPEG2. The supervisor further receives control signals C from each connected user station via a modem 107.

One of the user stations 200 is shown in greater detail in FIG. 1. The stations comprises a modem 201 which receives the transmitted MPEG2 bit stream from server 100 and returns control signals C to the server. A demultiplexer 202 separates the data signals D from the compressed video bit stream M. The data signals D are applied to an operating processor 203, the bit stream M is applied to an MPEG decoder 204. The MPEG decoder decodes the bit stream M and applies the decoded video and audio signal for reproduction to a television receiver 205. The operating processor not only receives the data signals D from the server but also the remote control signals from a remote control unit 206, and generates the control signals C which are intended for the server. The operating processor 203 further comprises an on-screen-display character generator (not shown) by means of which menu images and the like are generated and are applied as on-screen display signals OSD to the television receiver. Finally, the operating processor is coupled to a chip card read and write device 207.

Figure 2:
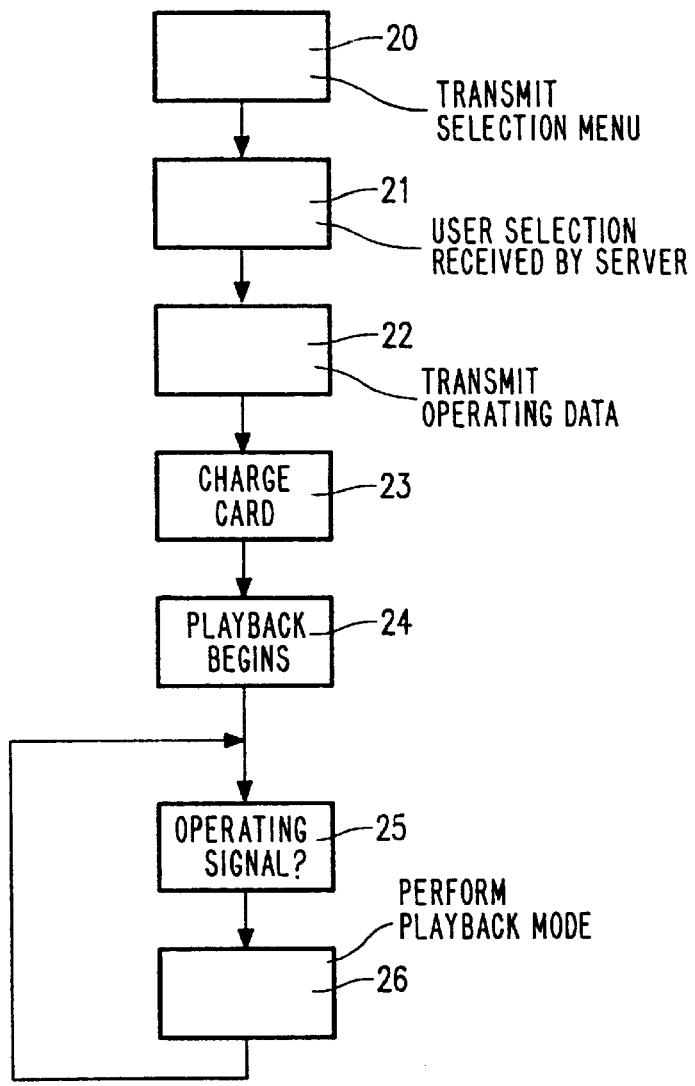
FIG. 2 shows a flow chart of steps performed by a computer shown in FIG. 1.

The operation of the server will now be further explained with reference to a flow chart shown in FIG. 2 and performed by the supervisor. It is assumed that a connection has already been established between the server and a user station and that the user has already selected one of the stored television programs for display.

Figure 3:
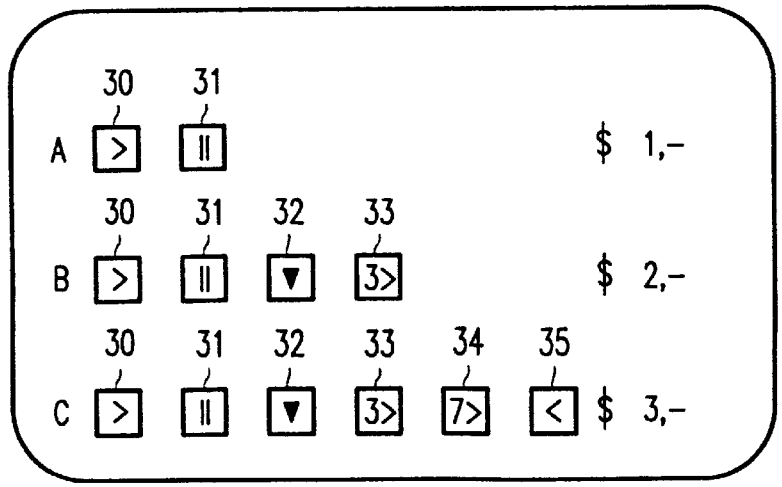
FIG. 3 shows a menu of possibilities for selecting operating data.

In a first step 20, the server transmits a selection menu to the user station and waits for a response from the user. This menu can be transmitted in the form of a compressed MPEG video image or in the form of teletext-like data transmitted as data signal D (see FIG. 1). The menu is displayed on the display screen of the user station and enables the user to choose from different "user interfaces". FIG. 3 shows an example of a menu having three selection possibilities. As has been attempted to show in this Figure, selection A has only two operating facilities "play" and "stop" denoted by pictograms 30 and 31, respectively. It is also stated which amount will be charged for selecting the program having these operating facilities. Selection B is more expensive and also provides the possibility of still pictures (pictogram 32) and display at threefold speed (pictogram 33). Selection C is the most expensive and provides further functions such as display at a sevenfold speed (pictogram 34) and reverse display (pictogram 35). The selection made by the user is transmitted to the server as a control signal C (see FIG. 1).

Figure 4:
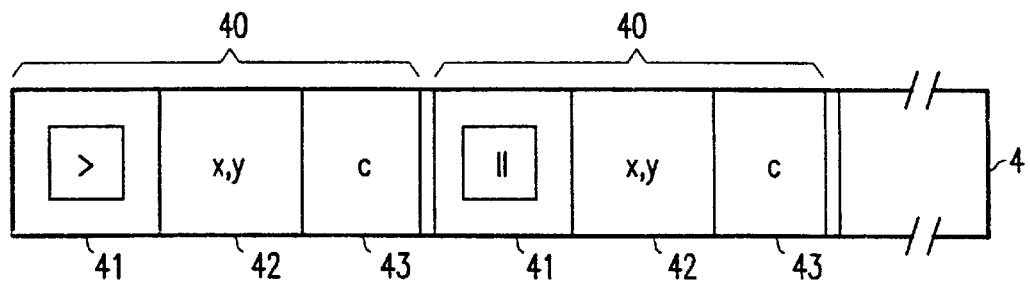
FIG. 4 shows a possible transmission format for the transmission of operating data from the server to a user station.

The selection made by the user is received by the server in a step 21. In response thereto, the server performs a step 22 in which it transmits operating data corresponding to the selection made to the user station as an operating signal D (see FIG. 1). A possible transmission format of the operating data is shown in FIG. 4. The operating data is accommodated in a data packet 4 which successively comprises for each available operating function 40: a coded representation 41 of a pictogram to be displayed, the coordinates x, y thereof on the display screen (denoted by 42), and possibly a code c (43) for the operating signal which must be transmitted by the user station to the server upon activation of the pictogram.

In a subsequent step 23, the server instructs the station to subtract a given amount from the balance on the chip card. Subsequently, playback of the selected television program is started in a step 24 and the supervisor waits, in a step 25, for an operating signal from the user station. When such an operating signal is received, for example a "fast display" signal, the relevant playback mode is performed in a step 26. The program performed by the supervisor subsequently returns to the step 25 to wait for further operating signals. It is to be noted that each received operating signal can be performed by the server without further conditions. As will be apparent from the following, the user station can in fact only transmit those operating signals for which the user is authorized. For example, if the user has made selection B, then the station is not capable of requesting display at the sevenfold speed. However, it is also possible for the supervisor to check whether a received operating signal corresponds to the playback modi made available so as to recognize fraudulent modifications of the user station.

The operation of the user station will now be further explained with reference to a flow chart shown in FIG. 5 and performed by the operating processor 203 (see FIG. 1). It will again be assumed that the connection between server and user station has already been established and that the user has selected a television program.

In a first step 50, the processor receives the menu shown in FIG. 3 in the form of data signal D and displays it on the display screen. The user makes a selection from the facilities A, B and C by positioning a cursor on the relevant menu item by means of the remote control unit and by subsequently energizing it. In a step 51, the selection made is transmitted as control signal C (see FIG. 1) to the server. In a step 52, the operating data is subsequently received and stored in a memory (not shown). Moreover, the instruction for subtracting the amount from the chip card is performed in a step 53.

Figure 6:
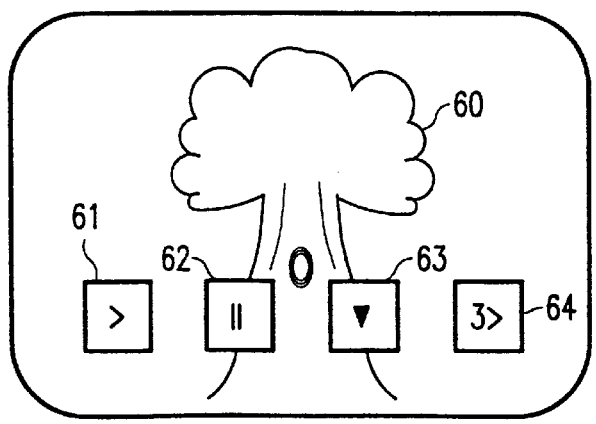
FIG. 6 shows an example of a displayed operating menu.

While the received video bit stream is decoded in a further autonomous manner by the MPEG decoder and the decoded image is displayed on the television receiver, the processor waits in a step 54 for operating actions by the user. As soon as the user has depressed a menu key on the remote control unit, the processor performs a step 55. In this step, the stored operating data (see FIG. 4) is read and the pictograms defined therein are displayed at the respective positions x, y of the display screen. FIG. 6 shows an example of the displayed image in the case where the operating data corresponding to selection B (see FIG. 3) was transmitted to the user station. In this Figure, the reference numeral 60 represents the video program. The pictograms 61, 62, 63 and 64 constitute an operating menu having the playback functions "play", "stop", "still picture" and "fast display at threefold speed". Other playback modi are not available for selection B.

Figure 5:
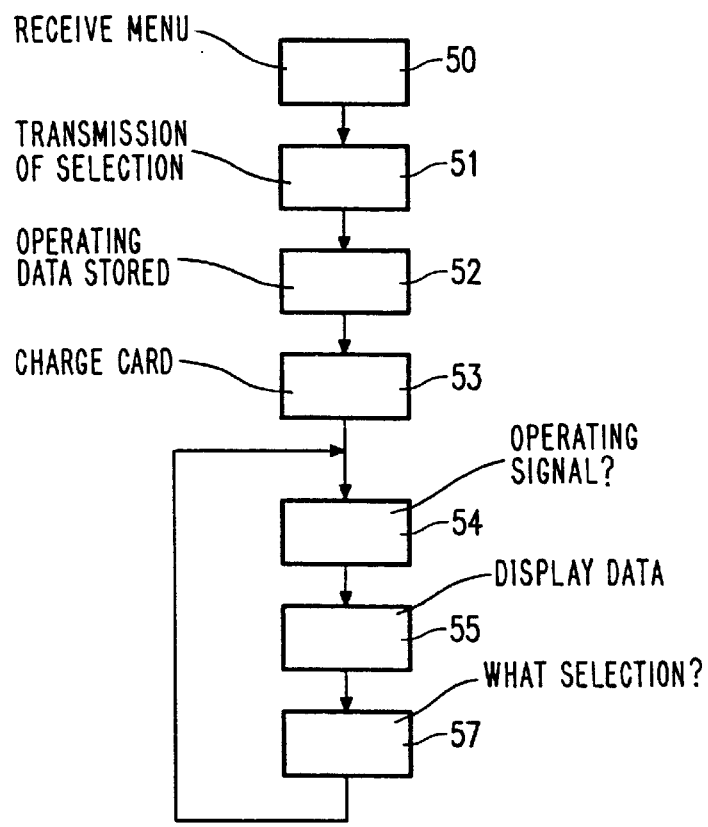
FIG. 5 shows a flow chart of steps performed by an operating processor shown in FIG. 1.

Reverting to FIG. 5, the processor continues with a step 57. In this step it is checked which pictogram is activated by means of the cursor. The corresponding operating signal is searched in the stored operating data, and the processor transmits the code c thus found (see FIG. 4) in the form of control signal C to the server. The action corresponding to the pictogram is performed by the server. The operating menu now disappears and the processor returns to step 54 so as to wait for the next operating action.

It is to be noted that the server may be adapted to modify the operating data during transmission of the television program. This provides the possibility of offering the user an "inexpensive" operating interface with which a motion film can be displayed at a fast speed, but the commercials occurring therein are not displayed. In this embodiment, the server transmits new operating data at the start and end of the commercials (step 22 in FIG. 2) and the user station is adapted to store them upon each reception (step 52 in FIG. 5) and overwrite the old version.

In summary, a video-on-demand system is described, which comprises a server and a user station. The video server is adapted to reproduce a selected television signal in various playback modi (normal, fast display, slow display, winding, rewinding, pause, etc.) in response to operating signals from the user station. Operating data which define the available operating signals (the user interface) are fixed in the server and are transmitted by the server to the station. The invention provides the possibility of downloading different versions of the user interface at different prices. For example, a television program with commercials may be offered with or without the facility of fast display.

I claim:
1. A video-on-demand system comprising:
   a video server for transmitting a selected television program signal together with operating data defining an operating signal for playback of the television signal in accordance with any of a plurality of available sets of playback modi; and a user station for receiving and displaying the selected television program, said user station including an operating processor for generating and transmitting to the server an operating signal corresponding to a selected one of said sets of available playback modi;

characterized in that the operating data transmitted by the server defines available sets of playback modi of the television signal, and the operating processor in the user station is adapted to receive and store the operating data for a selected one of said sets of playback modi and to transmit an operating signal corresponding to said selected set to said server.

2. A video-on-demand system as claimed in claim 1, wherein the user station further comprises means for enabling the operating processor to charge an amount for receiving the selected television program, the charged amount being dependent on the selected set of playback modi.

3. A video-on-demand system as claimed in claim 1, wherein the server is adapted to modify the operating data associated with a selected television program during transmission of said program.

4. A video-on-demand server for transmitting a selected television signal to a user station, said server comprising means for re-transmitting the television signal in accordance with any of a plurality of available sets of playback modi defined by operating data; and means for transmitting to the user station operating data defining the available sets of playback modi.

5. A video-on-demand server as claimed in claim 4, wherein the operating data transmitted by the server enables the user station to generate an operating signal corresponding to a selected one of said sets of playback modi.

6. A video-on-demand server as claimed in claim 5, further comprising means for enabling the user station to charge an amount for receiving a selected television program, the charged amount being dependent on the selected set of playback modi.

7. A video-on-demand server as claimed in claim 6, wherein the server is adapted to modify the operating data during transmission of the selected television program.

8. A user station for receiving and displaying a television program corresponding to a selected television signal transmitted by a video-on-demand server, said user station comprising an operating processor for generating and transmitting to the server an operating signal which defines a selected one of a plurality of available sets of playback modi; characterized in that the operating processor is adapted to receive from the server operating data defining the available sets of playback modi, to store the operating data for a selected one of said sets of playback modi, and to generate and transmit to the server an operating signal defining the selected set of playback modi.

9. A user station as claimed in claim 8, further comprising means for charging an amount for receiving a selected television program, the charged amount being dependent on the selected set of playback modi.

10. A user station as claimed in claim 9, wherein the operating processor is adapted to receive modified operating data during transmission of a selected television program and to replace the already stored operating data with the modified data.

11. A method of transmitting a television signal representing a selected television program from a video server to a user station, the server being adapted to transmit the television signal in accordance with a selected one of a plurality of available sets of playback modi defined by operating signals, the user station being adapted to generate and transmit said operating signals to the server; said method comprising the steps of:

transmitting from the server operating data defining the available sets of playback modi;

storing in the user station the operating data for a selected one of said sets; and transmitting from the user station to the server an operating signal corresponding to the selected set of playback modi.

12. A method as claimed in claim 11, wherein the user station charges an amount for receiving a television program, the charged amount being dependent on the selected set of playback modi.

13. A method as claimed in claim 11, wherein the server modifies the operating data during transmission of the selected television program.

\* \* \* \* \*